(12) United States Patent
Kim

(10) Patent No.: US 11,265,654 B1
(45) Date of Patent: Mar. 1, 2022

(54) TWO-CHANNEL UHF BLUETOOTH MICROPHONE RECEIVER

(71) Applicant: Doors Korea Co., Ltd, Seoul (KR)

(72) Inventor: Dae Sung Kim, Seoul (KR)

(73) Assignee: DOORS KOREA CO., LTD., Seoul (KR)

( * ) Notice: Subject to any disclaimer, the term of this patent is extended or adjusted under 35 U.S.C. 154(b) by 0 days.

(21) Appl. No.: 17/089,067

(22) Filed: Nov. 4, 2020

(51) Int. Cl.
*H04R 3/12* (2006.01)
*H04R 1/08* (2006.01)
*H04W 4/80* (2018.01)
*H04R 3/00* (2006.01)

(52) U.S. Cl.
CPC .............. *H04R 3/12* (2013.01); *H04R 1/08* (2013.01); *H04R 3/005* (2013.01); *H04W 4/80* (2018.02); *H04R 2420/07* (2013.01)

(58) Field of Classification Search
CPC . H04R 3/005; H04R 3/12; H04R 1/08; H04R 2420/07; H04W 4/80
USPC ............... 381/56, 58, 59, 91, 104, 122, 124
See application file for complete search history.

(56) References Cited

U.S. PATENT DOCUMENTS

2004/0224638 A1* 11/2004 Fadell ..................... G06F 17/00
455/66.1
2019/0280782 A1* 9/2019 Elberbaum ...... H04B 10/07955

* cited by examiner

*Primary Examiner* — William A Jerez Lora
(74) *Attorney, Agent, or Firm* — Novick, Kim & Lee, PLLC; Jae Youn Kim

(57) ABSTRACT

Disclosed herein is a wireless microphone system including a multifunctional Bluetooth microphone with a touch screen and a two-channel UHF (Ultra high frequency) Bluetooth microphone receiver receives a voice signal by performing a short-distance communication with the multifunctional Bluetooth microphone with a touch screen to transmit the voice signal to a third device for playback.

1 Claim, 17 Drawing Sheets

TWO-CHANNEL UHF BLUETOOTH MICROPHONE RECEIVER

TECHNICAL FIELD

The present invention relates to a two-channel microphone receiver, which receives and processes a voice signal by a receiver module having a two-channel receiving channel from a Bluetooth microphone.

BACKGROUND ART

A microphone receiver receiving a wireless microphone signal mostly output a voice signal from a RF signal through the process including, filtering a frequency band of wireless RF signal input via an antenna, amplifying a filtered RF signal, mixing an RF signal and an oscillation frequency, repeating an amplifying process of filtering a mixed medium frequency, sending a signal to an audio output side by removing distortion and noise portion.

In the case of a microphone receiver being used in a device using a plurality of wireless microphones, using individual microphone receivers with as many as the number of wireless microphones used to be common. This acts as a cause of increase in cost and volume. Accordingly, when using the plurality of wireless microphones, a microphone receiver is required for managing comprehensively by simultaneously or sequentially receiving signals received from the plurality of wireless microphones.

Meanwhile, Bluetooth means a short-range wireless technique standard for exchanging information by connecting portable devices such as cellular phones, notebook computers, earphones, headphones or the like. It is mainly used when a low-power wireless connection is required at a very short distance of around 10 meters.

For example, when a Bluetooth headset is used, it is possible to listen to music embedded in an MP3 player or a smartphone in a pocket with a bothersome cable.

As in the same concept, a Bluetooth microphone may be used when a user sends and sings a song built or stored in the device itself or built in a smartphone.

The Bluetooth microphone like this may be used for boosting excitement at a party or the like, for practicing singing alone, or for enjoying poetry recitation playing calm music.

In Particular, the Bluetooth microphone is widely used when a user wants to practice singing alone at home or in a car without visiting a karaoke room. Therefore, in recent years, Bluetooth microphones manufactured in various unique designs or Bluetooth microphones having various functions are released as a product.

However, considering that most of the products are only equipped with functions as simple as to link a karaoke application even though various functions are added to the Bluetooth microphones, the functions are too trivial to raise the value as a product.

Therefore, considering that when a Bluetooth microphone can be equipped with a function such as a digital signal processor (DSP), various functions such as an echo function and the like may be added to a singing voice by performing digital signal processing on the voice of a singing person, and a user may enjoy singing more cheerfully, and therefore, the Bluetooth microphone may attract interest and curiosity of consumers, at least a need for a Bluetooth microphone to which these functions can be added is emerged.

SUMMARY OF THE INVENTION

Therefore, one aspect of the present invention is to receive a voice signal by performing short-range communication with a multifunctional Bluetooth microphone and a multifunctional Bluetooth microphone with the touch screen, and disclose the wireless microphone system including a two-channel UHF (Ultra high frequency) by transmitting the voice signal to a third device for playback.

Another aspect of the invention discloses a two-channel UHF Bluetooth microphone receiver having two receiving channels of a Bluetooth receiving channel and a UHF signal receiving channel.

Another aspect of the invention discloses a mounting module having a cylindrical mounting groove and storing a cylindrical object inserted into the mounting groove in an upright state.

Another aspect of the present invention discloses a pressing portion provided to vacuum-absorb the mounting module with respect to the mounting surface of the mounting module.

The technical objects of the present invention are not limited to the above-mentioned technical problems, and other technical subjects not mentioned can be clearly understood by those skilled in the art from the following description.

A two-channel UHF Bluetooth microphone receiver according to one aspect of the present invention is formed as a cylindrical structure, and a connection terminal of a speaker module is connected to a bottom surface.

Meanwhile, a body unit includes a receiver digital signal processing unit provided in the body unit and configured to process a digital signal to a voice signal of a human voice and to add an extra function of at least one type of echo mode or at least one type of voice modulation mode; a first channel receiver unit provided in the body unit to receive a voice signal transmitted from a wireless microphone having a plurality of Bluetooth functions, applied with an antenna for receiving an RF signal, and having a receiver channel of a UHF (Ultra high frequency); a second channel receiver unit provided in the body unit to receive a voice signal transmitted from a wireless microphone having a plurality of Bluetooth functions, applied with an antenna for receiving an RF signal, and having a receiver channel of a Bluetooth signal; a receiver transmission unit provided in the body unit to transmit and the voice signal received through the first channel receiver unit or the second channel receiver unit to a third device to be played back; and a receiver controller provided in the body unit to control operations of the receiver digital signal processing unit, the first channel receiver unit, the second channel receiver unit, and the receiver transmission unit based on an input signal of an input unit provided in the body unit;

the body unit further includes a mounting module having the receiver controller, the receiver digital signal processing unit, the first channel receiving unit, the second channel receiver unit, and the receiver transmitting unit mounted thereon, and connecting the speaker module on a bottom surface, and at least a part of the bottom of the body unit inserted and mounted;

the mounting module includes a mounting block formed in a box shape having an internal space; a support unit provided and attached on a bottom surface of the mounting block; and a mounting groove formed to be concaved inwards from an upper center of the mounting block, and in that at least a portion of the lower part of the body unit is inserted and accommodated;

the mounting groove includes a fixing structure provided on a wall surface of the mounting groove, to press and fix at least part of the lower portion of the body unit inserted into the mounting groove, the fixing structure includes a pad unit provided in plural at equal intervals to support by a point at least a part of the lower portion of the body unit inserted into the mounting groove, and provided to apply an elasticity in a direction protruding from the wall surface of the mounting groove through a spring; and a vibration generating unit provided inside the mounting block, connected to the pad unit through the spring, configured to arrange at least one resonance generator and a vibrator vibrating by a unique resonance frequency oscillated by an oscillation unit in the resonance generator, provided with a predetermined control module chip to generate a vibration by oscillating the unique resonance frequency according to a preset period, and applying vibration to the pad unit through the spring.

In the multifunctional Bluetooth microphone with a touch screen according to an embodiment of the present invention, a microphone head is formed at one end and a touch screen is provided at one side.

Meanwhile, a handle formed at one end of the microphone head to which the voice signal is input; an device mounting unit provided at one end of the handle, on which Bluetooth technology is implemented, and a high power speaker module that is provided on one side; a microphone digital signal processing unit provided in the device mounting unit, and perform a digital signal processing to a voice signal of a human voice thereby an additional function of at least one type of echo mode or at least one type of voice modulation mode of the voice added; a microphone transmission unit provided on the device mounting unit and configured to mix the music source transmitted via Bluetooth with an input of a human voice and transmitting to a microphone receiver through FM transmission for output; an MR removal function unit removing a chorus and an Music Recorded (MR) unit from the music source received via Bluetooth; a microphone controller controlling the functions of MR removal function unit and the microphone transmission unit and the microphone digital signal processing unit based on an input signal through the touch screen; a multi-USB port disposed in the center of lower portion of the handle; a USB light-emitting lamp having a terminal coupling unit that can be detached and coupled to the multi-USB port, and emitting the light when connecting the multi-USB port by the microphone controller; a rotation lamp ball having a terminal having a terminal coupling unit that can be detached and coupled to the multi-USB port, and emitting the light while rotating when connecting the multi-USB port by the microphone controller; and a disinfection spray unit including a container body formed on one side of the device mounting unit containing a predetermined disinfectant, a container head exposed on the upper unit of the device mounting unit; a spray nozzle provided on the container head and spraying a disinfectant solution toward the microphone head, a button for spraying the disinfectant solution toward the container head through the spray nozzle, a lower part of the handle further includes a mounting module at least a portion inserted and mounted;

the mounting module includes a mounting block formed in a box shape having an internal space; a support unit provided and attached on a bottom surface of the mounting block;

and a mounting groove formed to be concaved inwards from an upper center of the mounting block, and in that at least a portion of the lower part of the body unit is inserted and accommodated;

the mounting groove includes a fixing structure provided on a wall surface of the mounting groove to press and fix at least part of the lower portion of the handle unit inserted into the mounting groove, the fixing structure includes a pad unit provided in plural at equal intervals to support by point at least part of the lower portion of the handle inserted into the mounting groove, and provided to apply an elasticity in a direction protruding from the wall surface of the mounting groove through a spring; a vibration generating unit provided inside the mounting block, connected to the pad unit through the spring, configured to arrange at least one resonance generator and a vibrator vibrating by a unique resonance frequency oscillated by an oscillation unit in the resonance generator, provided with a predetermined control module chip to generate vibration by oscillating the unique resonance frequency according to a preset cycle, and applying the vibration to the pad unit through the spring.

Meanwhile, the support unit includes an adhesion unit having an inner space and provided to move up/down in the inner space, the adhesion unit includes a fixing plate fixedly installed on the inner upper end of the support unit and forming an elevating space downward; a adhesion plate formed in a shape of corresponding the fixing plate and provided to move up/down in the elevation space; a moving unit connecting the adhesion plate so as to move up/down for the fixing plate; and a pressing unit provided on the adhesion plate in plural, and installed on the adhesion plate so that at least a portion of the adhesion plate protrudes from the bottom surface of the adhesion plate, the moving unit includes a horizontal gear installed in parallel horizontally on the bottom surface of the fixing plate through installation bracket provided on the bottom side of the fixing plate; an operation bar extending from the horizontal gear, provided outside through the support unit and rotated by a user to rotate the horizontal gear; a vertical gear engaged with the horizontal gear and connected in the vertical direction; and a rotating rod extending to the direction of a lower part of the vertical gear, forming a thread on the outer circumference and screwed to the center of the adhesion plate, move up/down the adhesion plate when the vertical gear is rotated by the horizontal gear, the pressing unit includes a pressing plate forming a cylindrical shape having a predetermined height with a lower surface open, an upper side is installed on the bottom surface of the adhesion plate, and having a installation blade formed radially spread downward along the outer circumference of the bottom surface; and a first pressing ring to a third pressure ring formed in a ring shape having an open top and bottom, and are sequentially adhered for mutual adhesion means and form an aperture toward the lower side of the pressing plate;

the first pressing ring is installed on the pressing plate through inserting the installation blade, the third pressing ring is adhered to the lower side of the first pressing ring and the second pressing ring adhered to each other, and has a bottom surface by forming a narrow lower portion, the first pressing ring to the third pressing ring may form a central portion deeper than the upper portion and the lower portion, and when the mounting plate is descending, the mounting surface of the mounting module may be vacuum-absorb by pressing.

DETAILED DESCRIPTION OF THE PREFERRED EMBODIMENT

Figure 1:
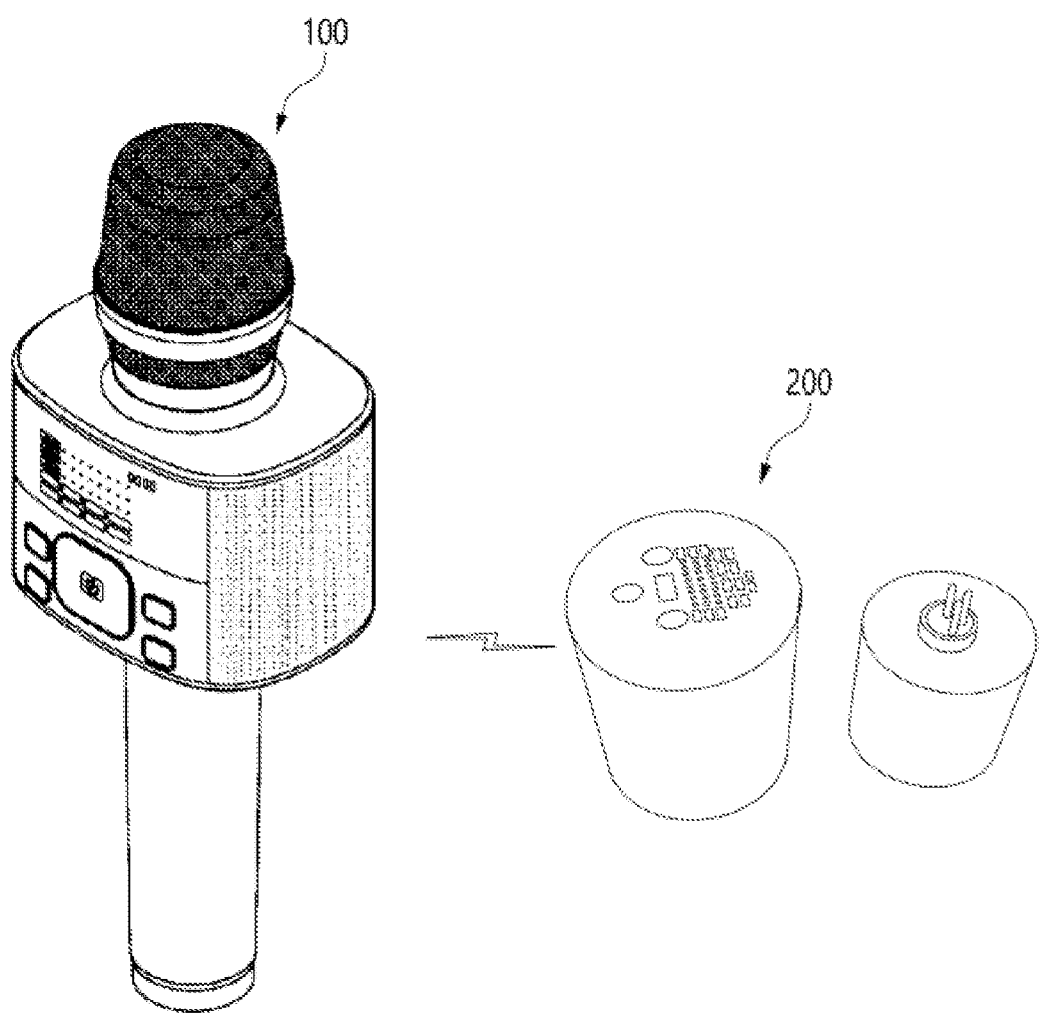
FIG. 1 shows a view of a wireless microphone system according to an embodiment of the present invention.

Advantages and features of the present invention, and a method of achieving them will become apparent with reference to the embodiments described below in detail together with the accompanying drawings. The present invention may be embodied in many different forms and should not be construed as being limited to the embodiments set forth herein. Rather, these embodiments are provided so that this disclosure will be thorough and complete, and will fully convey the concept of the invention to those skilled in the art, and the invention is only defined by the scope of the claims. Like reference numerals refer to like components throughout the specification.

It is to be understood that the terminology used herein is for the purpose of describing particular embodiments only and is not intended to be limiting of the invention. In the present specification, the singular form includes plural forms unless otherwise specified mentioned in a written phrase. The term "Comprises" and/or "comprising", as used herein is mentioned components, steps and operations and it does not preclude the presence or addition of one or more other features, steps, components or operations thereof.

FIG. 1 shows a view of a wireless microphone system according to an embodiment of the present invention.

Referring to FIG. 1, a wireless microphone system 1000 according to an embodiment of the present invention may include a multifunctional Bluetooth microphone with a touch screen 100 and a two-channel UHF (Ultra high frequency) Bluetooth microphone receiver 200.

The multifunctional Bluetooth microphone with a touch screen 100 is a Bluetooth microphone equipped with Bluetooth technology, which is a short-range communication means, may include a microphone module, and a speaker module.

For example, the multifunctional Bluetooth microphone with a touch screen 100 may convert a user's voice into an electrical signal and transmit it in a short distance using a Bluetooth communication means. In addition, the multifunctional Bluetooth microphone with a touch screen 100 may playback a sound source transmitted through Bluetooth.

In particular, the multifunctional Bluetooth microphone with a touch screen 100 according to the present embodiment outputs various states of functional control of its own and has a touch screen for receiving the control signal to increase user's convenience.

A two-channel UHF Bluetooth microphone receiver 200 may receive a voice signal in a short-range communication means and transmit to a third device for playback the voice signal.

For example, the two-channel UHF Bluetooth microphone receiver 200 performs a short-distance communication with the multifunctional Bluetooth microphone with a touch screen 100 to receive a voice signal, and transmit the voice signal to a car or an amplifier for playback.

In this embodiment, the two-channel UHF Bluetooth microphone receiver 200 is connected to a speaker module to play back a voice signal received through a short-distance communication means from the speaker module.

In particular, the two-channel UHF Bluetooth microphone receiver 200 may have two receiving channels of a Bluetooth receiving channel and a UHF signal receiving channel, and process a voice signal transmitted wirelessly from at least two wireless microphones in simultaneous, selective and sequential manners.

Hereinafter, each component of the wireless microphone system 1000 according to an embodiment of the present invention shown in FIG. 1 will be described in detail.

Figure 2:
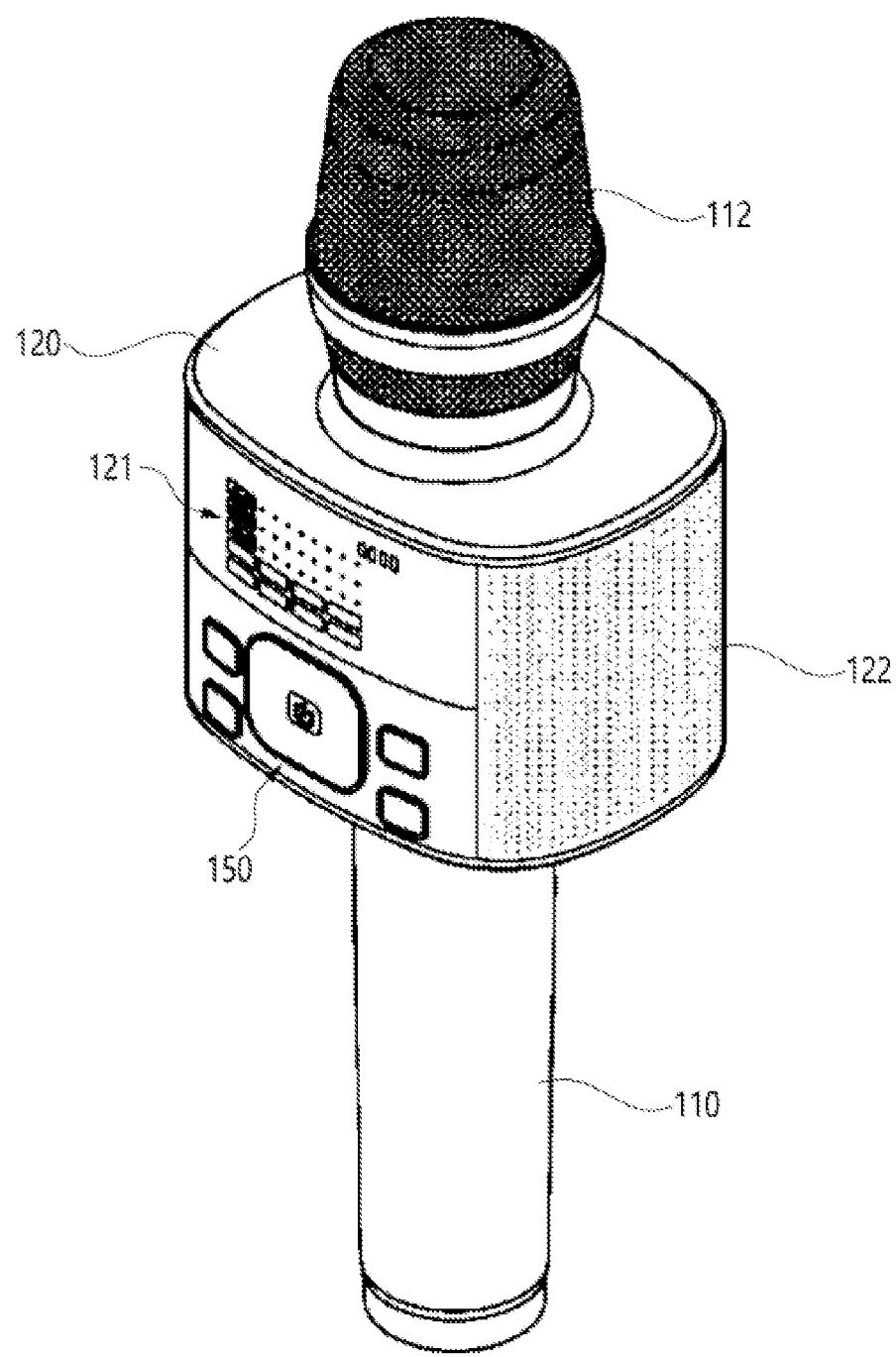
FIG. 2 is a perspective view of a multifunctional Bluetooth microphone with a touch screen according to an embodiment of the present invention.
Figure 3:
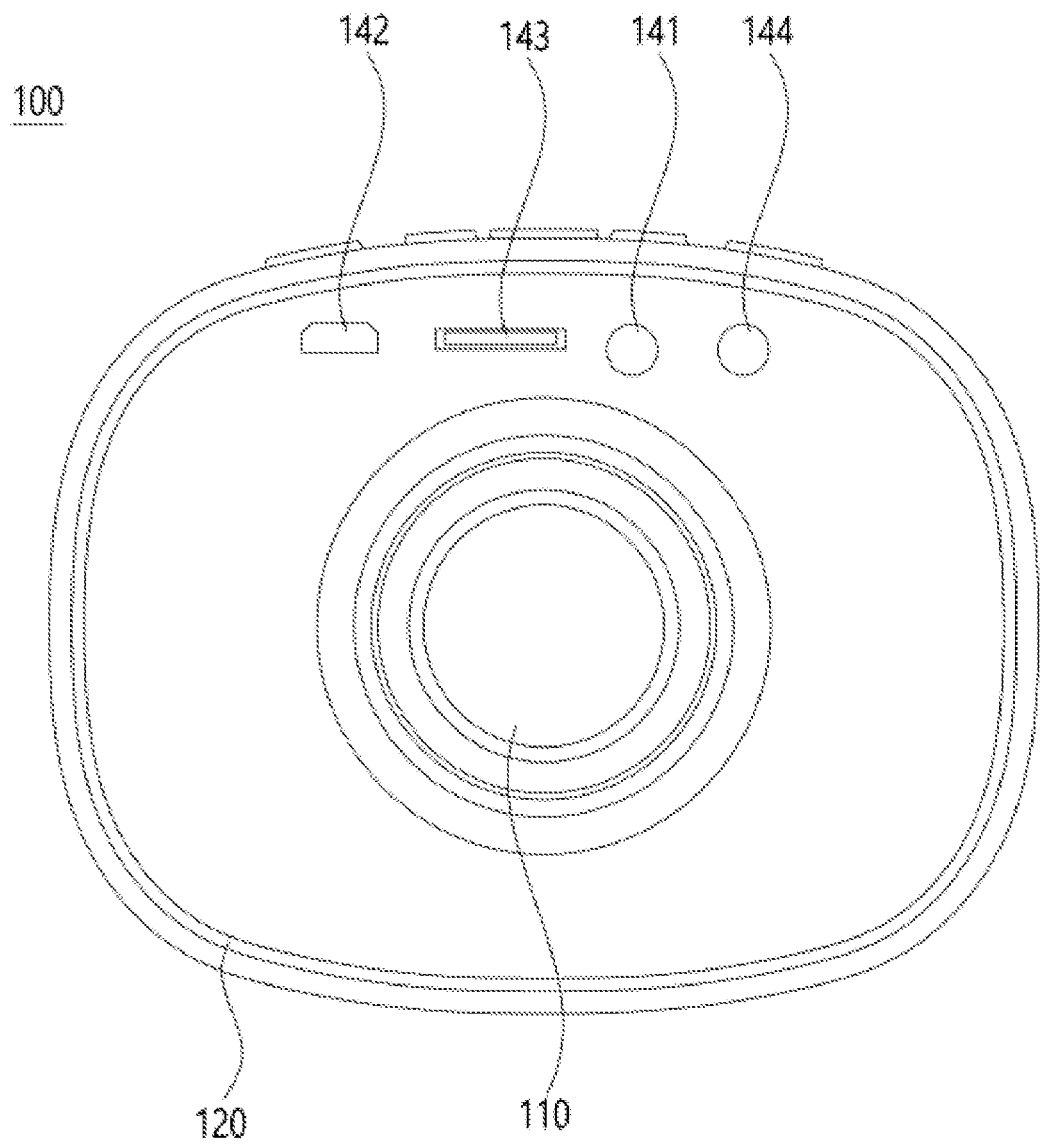
FIG. 3 is a bottom view of FIG. 2.
Figure 4:
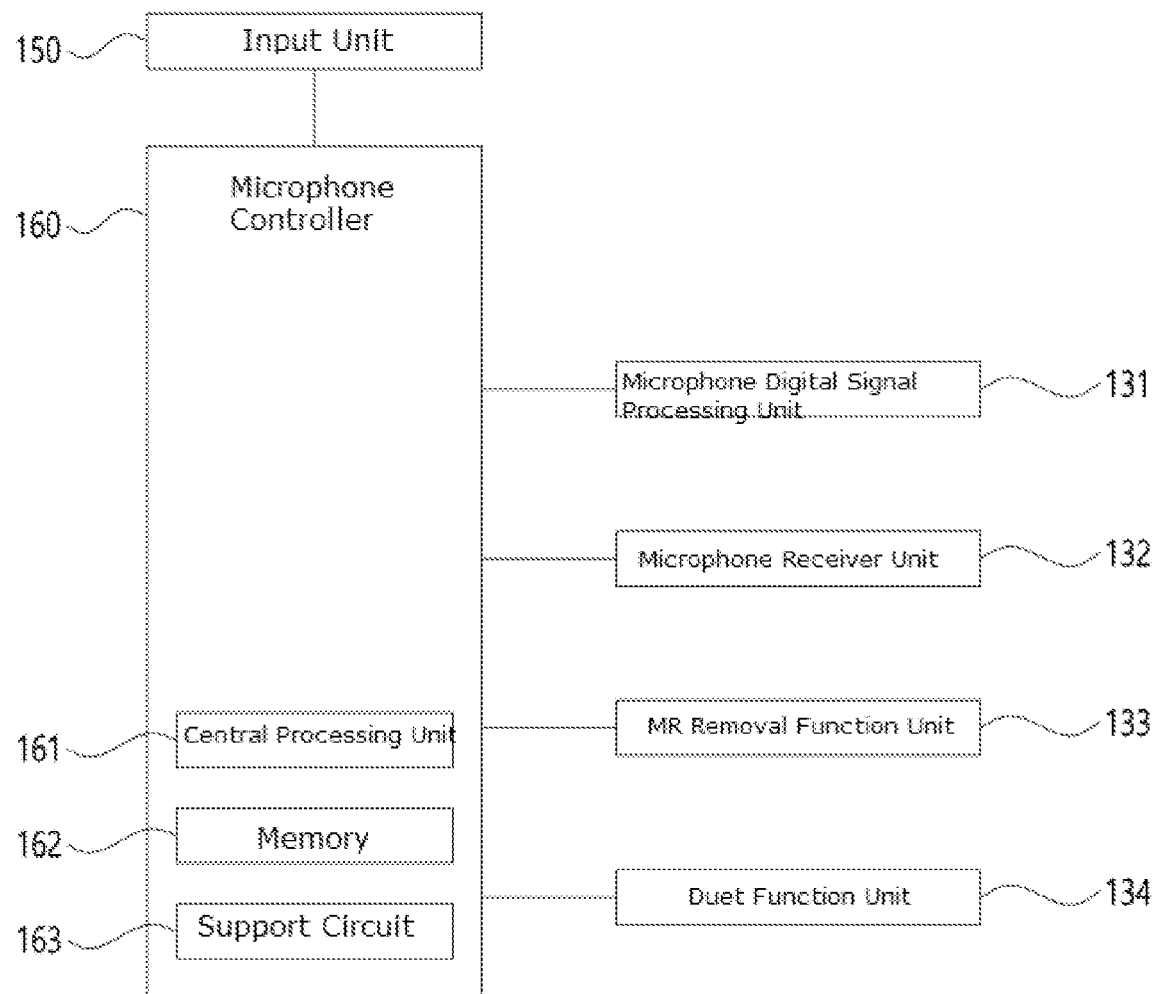
FIG. 4 is a control block diagram of a multifunctional Bluetooth microphone with a touch screen according to an embodiment of the present invention.

FIG. 2 is a perspective view of a multifunctional Bluetooth microphone with a touch screen according to an embodiment of the present invention, FIG. 3 is a bottom view of FIG. 2, and FIG. 4 is a control block diagram of a multifunctional Bluetooth microphone with a touch screen according to an embodiment of the present invention.

Referring to FIG. 2 to FIG. 4, the multifunctional Bluetooth microphone with a touch screen 100 according to an embodiment of the present invention may include a handle 110 formed at one end of a microphone head 112, a handle 120, a microphone digital signal processing unit 131, an input unit 150 and a microphone controller 160.

The handle 110 is a part, for example, for a user who wants to sing a song and grip with a hand. It may have a cross-sectional area that is enough to grip stably, and the outer surface may be applied with a non-slip material or may be coated with rubber.

The microphone head 112 into which a sound signal is input may be provided at an end of the handle 110. The shape of the microphone head 112 may be diverse without limit, more than the shapes shown in the drawings, and the scope of the present invention is not limited to the shapes in the drawings.

The handle 120 is provided on one side of the handle 110. A handle 120 is coupled to the handle 110 to be adjacent to the microphone head 112, and it is with Bluetooth technology, and a high-power speaker module 122 is provided on one side.

The handle 120 may form a box structure. A microphone receiver unit 132, an MR removal function unit 133, and a duet function unit 134, including a microphone digital signal processing unit 131, may be mounted in the handle 120, and an input unit 150 and a microphone controller 160 may be applied to control to select or execute of these modes.

The microphone digital signal processing unit 131 is provided in the handle 120, and it is a device or a module chip capable of adding an additional function of at least one type of echo mode or at least one type of voice modulation mode to a human voice by performing digital signal processing on the voice.

In general, its own voice is usually output as it is, but the multifunctional Bluetooth microphone with a touch screen 100 according to the present embodiment mounts the microphone digital signal processing unit 131 and may be implemented as an echo mode or a voice modulation mode according to an input condition from the input unit 150.

For example, in the case of a general lecture, conference, or meeting other than the karaoke mode, a non-echo mode may be selected, and in the case of singing, a singer-level restrained reverb effect mode, an echo mode suitable for singing, and a karaoke-class powerful echo mode or the like may be executed according to an input condition. All of these modes correspond to the echo mode.

In addition, modulation of a voice to an electronic voice, a female voice, a male voice, or a baby voice is possible, and as a voice may be output in various forms other than his or her own voice, the user may enjoy singing more cheerfully, and therefore, the Bluetooth microphone may attract interest and curiosity of consumers.

The microphone receiver unit 132 is provided in the handle 120 as a means for wireless expansion.

That is, the microphone transmission unit 132 outputs by mixing the sound source with the input a human voice transmitted via Bluetooth and then transmitting it to the two-channel UHF Bluetooth microphone receiver 200 through a FM transmission. This operation may also be controlled by the microphone controller 160 according to an input signal of the input unit 150.

The MR removal function unit 133 performs a function of emphasizing a human voice by removing chorus and accompaniment portions (Music Recorded, MR) from the sound source transferred through Bluetooth. The operation of the MR removal function unit 133 may also be controlled by the microphone controller 160 according to an input signal of the input unit 150.

Meanwhile, the duet function unit 134 is a mode used when it is desired to sing a song as a duet. In this case, two multifunctional Bluetooth microphones with a touch screen 100 are required.

The duet function unit 134 in connection with at least two sets of multifunctional Bluetooth microphone with a touch screen 100 and any of multifunctional Bluetooth microphone with a touch screen 100 of the Bluetooth sound source, all of the multifunctional Bluetooth microphone with a touch screen 100 may play back the Bluetooth sound source simultaneously while interlocking together.

The duet unit 134 like this may be conveniently used when singing a duet song. This operation may also be controlled by the microphone controller 160 according to an input signal of the input unit 150.

An auxiliary (Aux) out terminal unit 141, a multi-USB port 142, a memory card port 143, and an earphone jack 144 are provided on the bottom of the handle 120.

Aux out terminal 141 is a port for a wired expansion, in which connects to wired speakers or devices by connecting with a separate line, not wirelessly.

The multi-USB port 142 is a port that enables charging or data communication. Since a high-capacity battery (not shown) is mounted in the handle 120, the multi-USB port 142 may be used to charge the battery and to store sound sources such as songs or the like in the built-in memory.

The memory card port 143 is for expanding the memory by inserting an SD card or the like, and the earphone jack 144 is a part for connecting a headphone or an earphone.

Other than functions described above, a touch screen 120 may be provided on one side of the handle 120. The touch screen 121 may output an input value of the input unit 150, or may generate the input value according to user's touch operation instead of input unit 150. In addition, the status of a song played back may be displayed on the touch screen 121.

The touch screen 121 or the input unit 150 is provided in the handle 120, and it is a means for selecting various modes of the microphone transmission function unit 132 through the microphone digital signal processing unit 131, the MR removal function unit 133, and the duet function unit 134. Likewise the input unit 150 shown in a view herein may be implemented in a button form.

The microphone unit 160 may control the operation of the microphone digital signal processing unit 131, the microphone transmission unit 132, the MR removal function unit 133, and the duet function unit 134 on based on an input signal of the input unit 150 or the touch screen 121.

For this, the microphone controller 160 may include a central processing unit (CPU) 161, a memory 162, and a support circuit 163.

The central processing unit 161 may be one of various computer processors that can be industrially applied to control the operation of the microphone digital signal processing unit 131, the microphone transmission unit 132, the MR removal function unit 133, and the duet function unit 134 on based on an input signal of the input unit 150 or the touch screen 121.

The memory 162 may be connected to the central processing unit 161. The memory 162 may be locally or remotely installed as a computer-readable recording medium, and for example, it may be at least one or more memory units that can be easily used, such as random access memory (RAM), read only memory (ROM), a floppy disk, a hard disk, or an arbitrary digital storage form.

The support circuit 163 is coupled to the CPU 161 and can support normal operations of a processor. The support circuit 163 may include a cache, a power supply, a clock circuit, an input/output circuit, a subsystem, and the like.

In the present embodiment, the microphone controller 160 controls the operation of the digital signal processing unit 131, the microphone transmission function unit 132, the MR removal function unit 133, and the duet function unit 134 based on a touch screen 121 or an input signal of the input unit 150, and a series of control processes like this may be stored in the memory 162. Typically, software routines may be stored in the memory 162. The software routines may also be stored or executed by other central processing units (not shown).

Although a process according to the present invention has been described as being executed by a software routine, and at least some of the processes of the present invention may be executed by hardware. Like this, the processes of the present invention may be implemented as software executed on a computer system, hardware such as an integrated circuit, or a combination of software and hardware.

According to the present embodiment operating on the basis of the structure as described above, as various functions such as a digital signal processor 131 may be mounted in addition to conventional simple functions, a user may enjoy singing more cheerfully, and therefore, the Bluetooth microphone may attract interest and curiosity of consumers.

Figure 5:
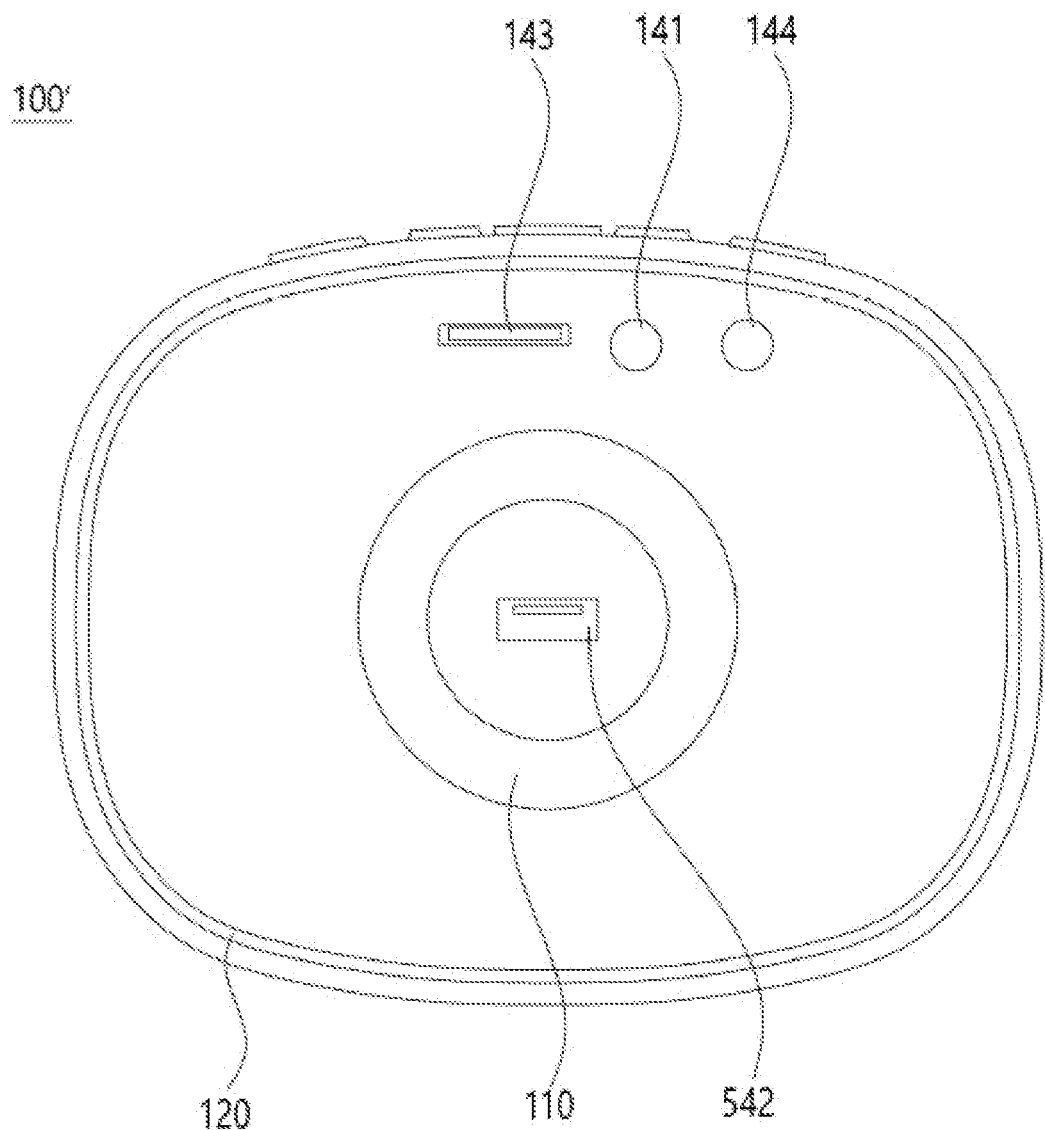
FIG. 5 is a bottom view of a multifunctional Bluetooth microphone with a touch screen according to another embodiment of the present invention.
Figure 6:
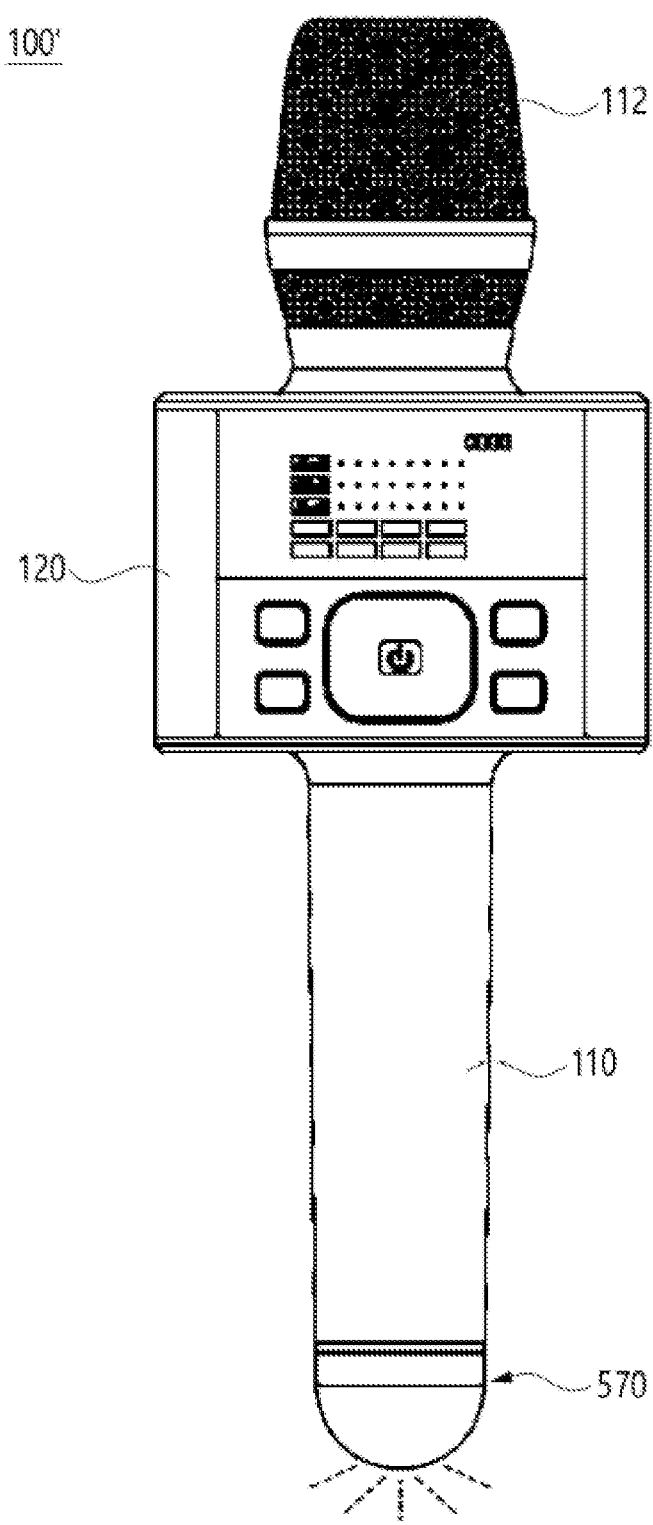
FIG. 6 and FIG. 7 show views of an USB light emitting lamp coupled and separated to a multifunctional Bluetooth microphone with a touch screen according to an embodiment of the present invention.
Figure 7:
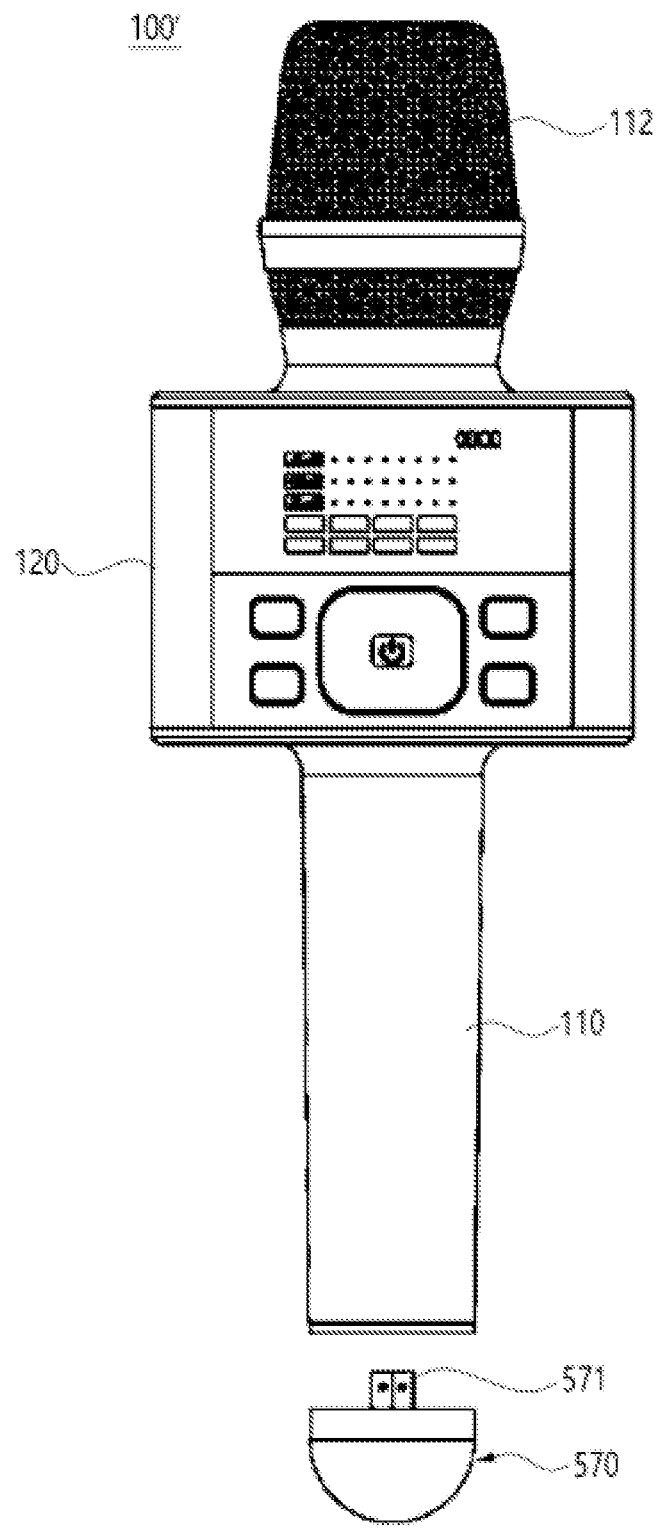

FIG. 5 is a bottom view of a multifunctional Bluetooth microphone with a touch screen according to another embodiment of the present invention, FIG. 6 and FIG. 7 show views of an USB light emitting lamp coupled and separated to a multifunctional Bluetooth microphone with a touch screen according to an embodiment of the present invention.

Referring to FIG. 5 to FIG. 7, the multifunctional Bluetooth microphone with a touch screen 100' according to another embodiment of the present invention may include the handle 110 formed at one end of the microphone head 112, the handle 120 having the microphone digital signal processing unit 131, the microphone transmission unit 132, the MR removal function unit 133 and the duet function unit 134, like the multifunctional Bluetooth microphone with a touch screen 100 according to an embodiment of the present invention.

A multi-USB port 542 for charging or communication is also formed in the multi-function Bluetooth microphone with a touch screen 100' according to the present embodiment, and the multi-USB port 542 may be disposed at the center on the bottom of the handle 110.

At this point, an additional USB light emitting lamp 570 may be connected to the multi-USB port 542 and used. The USB light emitting lamp 270 includes a terminal coupling unit 571 detachably coupled to the multi-USB port 242, and it is a lamp that emits light when music is output.

Meanwhile, in the present embodiment, the microphone controller 160 controls the operation of the USB light emitting lamp 570 to be automatically turned on when the USB light emitting lamp 570 is connected.

In other words, as music is output and the USB light emitting lamp 570 automatically operates at the same time only by inserting the USB light emitting lamp 570 without operating a separate button or switch, and convenience of use may be increased.

Figure 8:
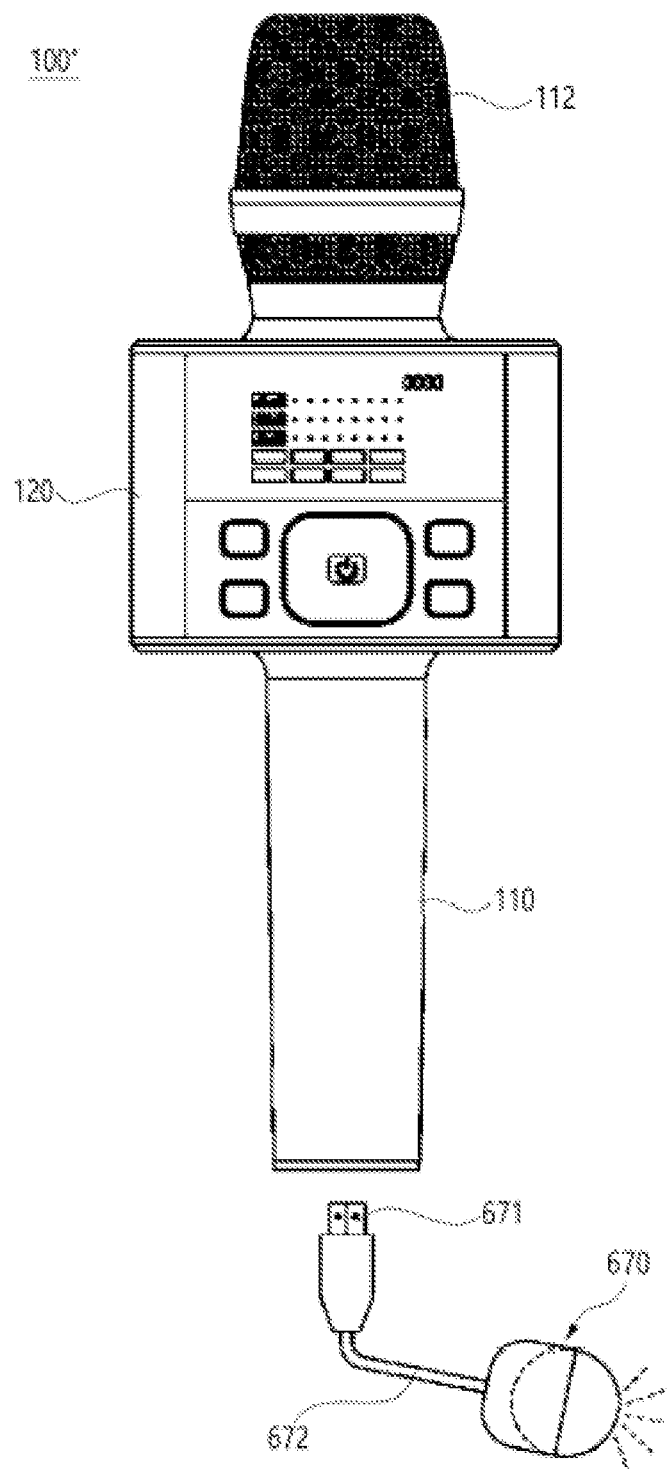
FIG. 8 is a front view showing a multifunctional Bluetooth microphone with a touch screen according to another embodiment of the present invention.

FIG. 8 is a front view showing a multifunctional Bluetooth microphone with a touch screen according to another embodiment of the present invention.

Referring to FIG. 8, the multifunctional Bluetooth microphone with a touch screen 100" according to another embodiment of the present invention may include the handle 110 formed at one end of the microphone head 112, the handle 120 having the microphone digital signal processing unit 131, the microphone transmission unit 132, the MR removal function unit 133 and the duet function unit 134, like the multifunctional Bluetooth microphone with a touch screen 100' according to an embodiment of the present invention.

A multifunctional Bluetooth microphone with a touch screen 100" according to the present embodiment also provided with a multi-USB port (not shown) for charging or communication. Although such a multi-USB port may be disposed at the center on the bottom of the handle 110, it may be placed at a different position.

In this structure, an additional USB light emitting rotating ball 670 may be used by connecting to the multi USB port.

The USB light emitting rotation ball 670 may include a terminal coupling unit 671 detachably coupled to the multi-USB port, a rotating lamp ball 673 for emitting light while rotating, and a connection line 672 for connecting the terminal coupling unit 671 and the rotating lamp ball 673.

In the present embodiment, the microphone controller 160 controls the operation of the USB light emitting rotation ball 670 to be automatically turned on when the USB light emitting rotation ball 670 is connected.

In other words, as music is output and the USB light emitting rotation ball 670 automatically operates at the same time only by inserting the USB light emitting rotation ball 670 without operating a separate button or switch, convenience of use may be increased.

Figure 9:
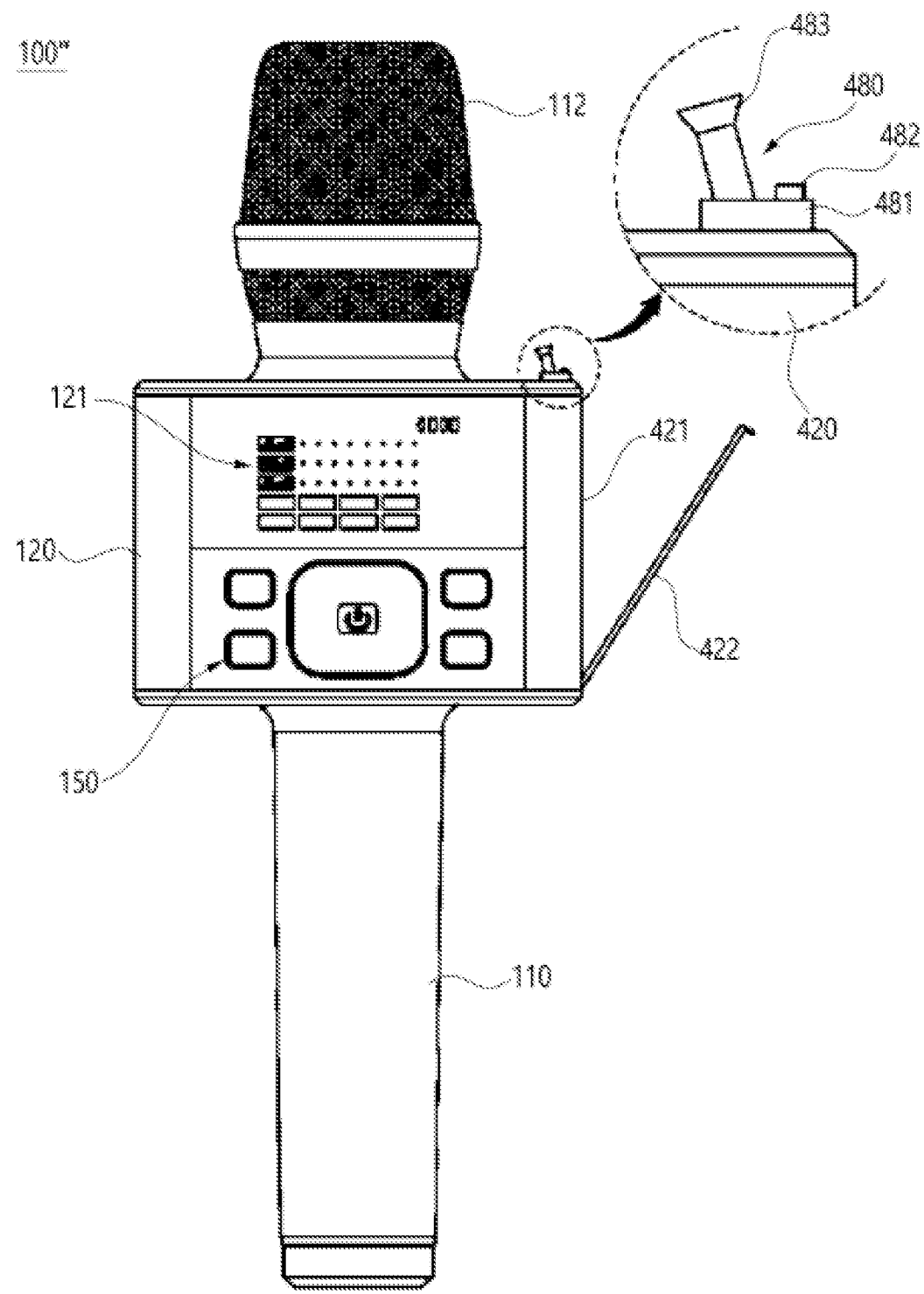
FIG. 9 is a view showing a multifunctional microphone with a touch screen according to another embodiment of the present invention.

FIG. 9 is a front view showing a multifunctional microphone with a touch screen according to another embodiment of the present invention.

Referring to FIG. 9, a multifunctional Bluetooth microphone with a touch screen 100''' according to another embodiment of the present invention may include the handle 110 formed at one end of the microphone head 112, the handle 120 having the microphone digital signal processing unit 131, the microphone transmission unit 132, the MR removal function unit 133 and the duet function unit 134 and etc., like the multifunctional Bluetooth microphone with a touch screen 100 according to an embodiment of the present invention.

The multifunctional Bluetooth microphone with a touch screen 100''' of the present embodiment is further provided with a disinfection spray unit 480 for killing viruses.

The disinfection spray unit 480 may include a container body (not shown) containing a predetermined disinfectant for killing viruses or sterilization, a container head 481 connected to the container body and exposed toward the top of the device mounting unit 420, a spray nozzle 483 provided in the container head 481 to spray disinfectant solution toward the microphone head 112, and a button 482 for spraying the disinfectant solution toward the container head 481 through the spray nozzle 483.

At this point, the container body may be installed to be replaceable in a container accommodation box 421 formed on one side of the device mounting unit 120. At this point, the container accommodation box 421 may be opened and closed using a rotating cover 422.

When the disinfection spray unit 480 is applied to the multifunctional Bluetooth microphone with a touch screen 100''' as described above, it is expected that the multifunctional Bluetooth microphone 400 can be used in a healthy way without a problem related to recent virus transmission. That is, since a user may sing a song using the multifunctional Bluetooth microphone 400 after spraying the disinfectant solution toward the container head 481 through the spray nozzle 483 by pressing the button 482, the product can be used safely.

Figure 10:
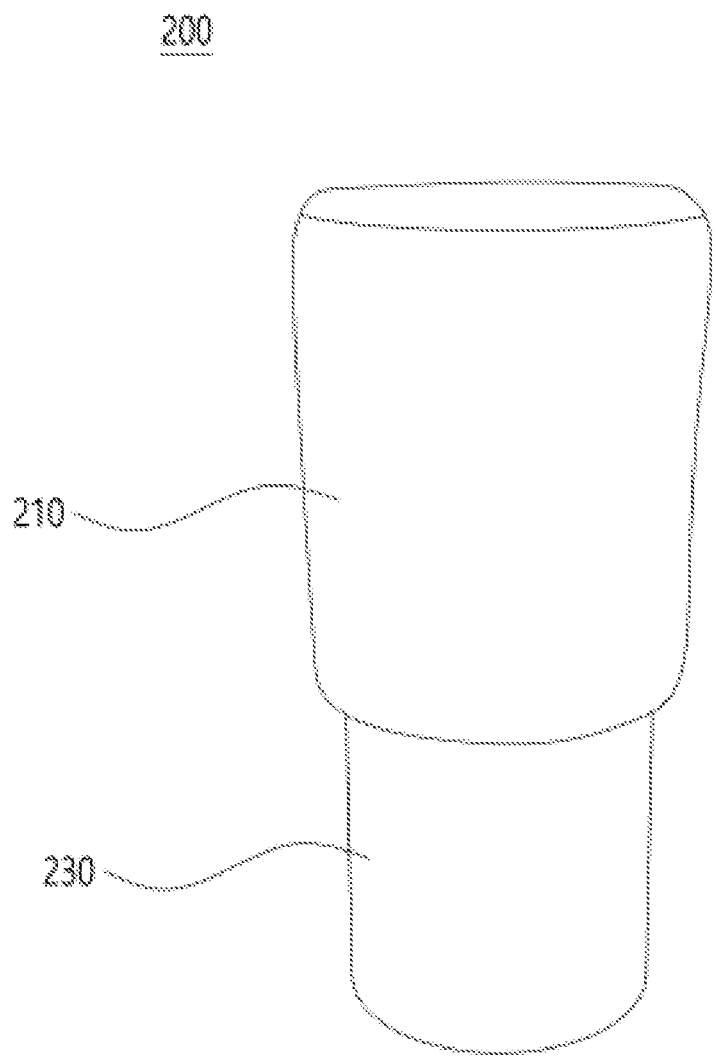
FIG. 10 and FIG. 11 are views showing a two-channel UHF Bluetooth microphone receiver according to an embodiment of the present invention.
Figure 11:
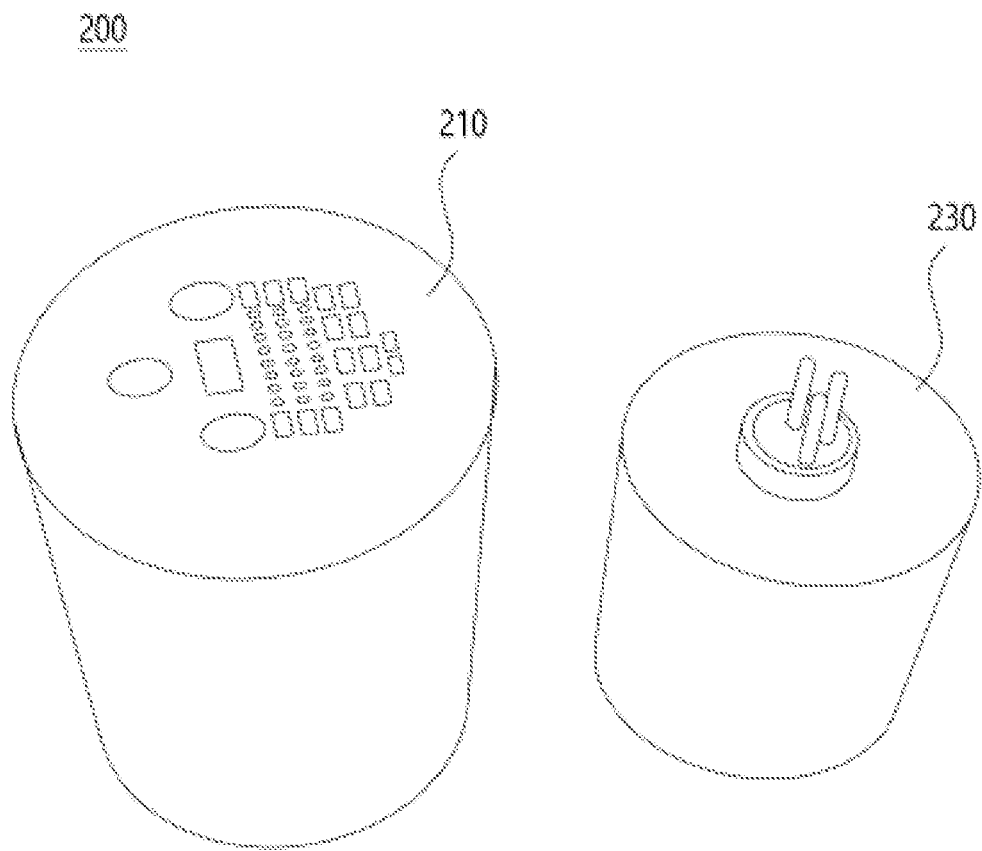
Figure 12:
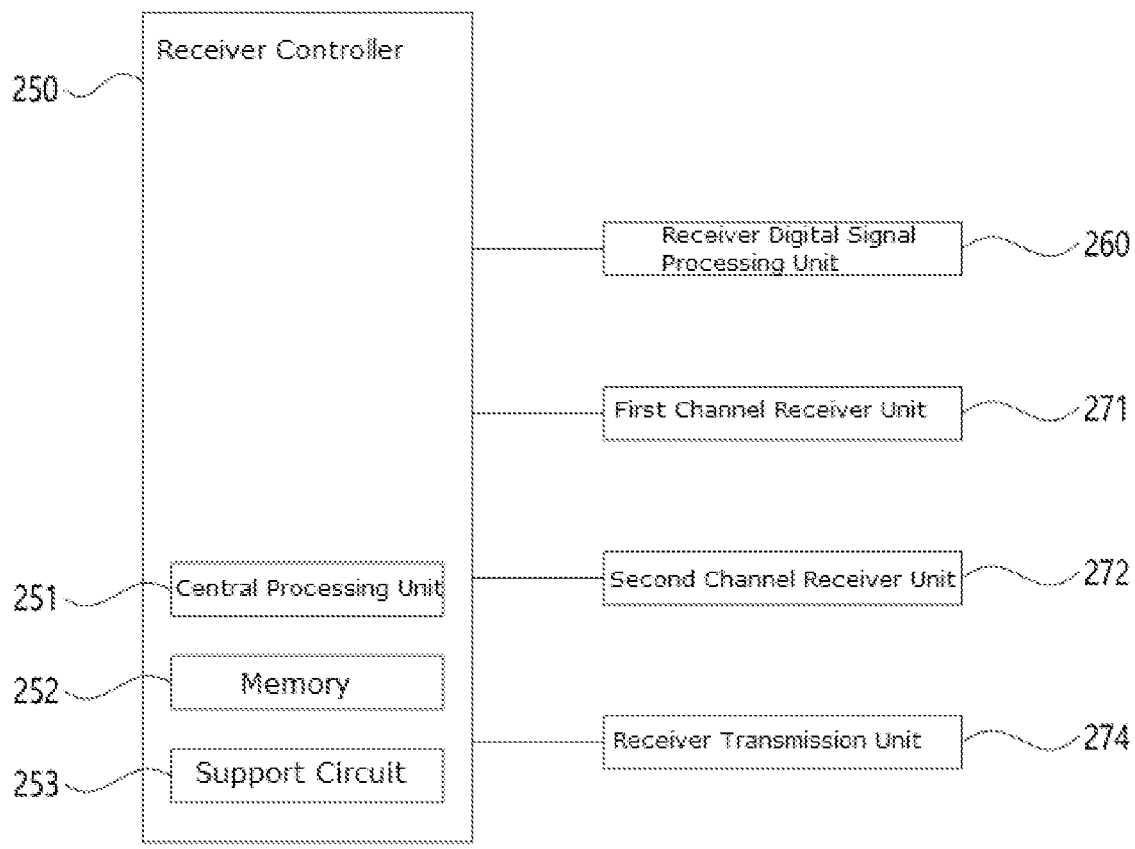
FIG. 12 is a control block diagram of the two-channel UHF Bluetooth microphone receiver according to an embodiment of the present invention.

FIG. 10 and FIG. 11 are views showing a two-channel UHF Bluetooth microphone receiver according to an embodiment of the present invention, and FIG. 12 is a control block diagram of the two-channel UHF Bluetooth microphone receiver according to an embodiment of the present invention.

Referring to FIG. 10 to FIG. 12, the two-channel UHF Bluetooth microphone receiver 200 according to an embodiment of the present invention may include a body unit 210 and a speaker module 230.

The body unit 210 may include a receiver controller 250, a receiver digital signal processing unit 260, a first channel receiver unit 271, a second channel receiver unit 272, a receiver transmission unit 274 and the like.

The body unit 210 may form a cylindrical structure, and the receiver controller 250, the receiver digital signal processing unit 260, the first channel receiver unit 271, the second channel receiver unit 272 and the receiver transmission unit 274 and the like are mounted inside of the body unit 210, and an input unit is applied to control a selection or an execution of these modes.

The receiver digital signal processing unit 260 is provided in the body unit 210, and it is a device or a module chip capable of adding an additional function of at least one type of echo mode or at least one type of voice modulation mode to a human voice by performing digital signal processing on the voice. A function of the receiver digital signal processing unit 260 is the same as that of the microphone digital signal processing unit 131 described above, the detailed description will be replaced with the above-mentioned. That is, the receiver digital signal processing unit 260 may implement an echo mode according to the input condition of the input unit.

In the first channel receiver unit 271 and the second channel receiver unit 272, a typical RF signal receiver antenna may be applied and implemented as first channel receiver unit 271 being a receiver channel of a UHF signal and the second channel receiver unit 272 being a receiver channel for a Bluetooth signal.

The first channel receiver unit 271 and the second channel receiver unit 272 may receive a voice signal transmitted from a plurality of multifunctional Bluetooth microphone 100.

The receiver transmission unit 274 is provided in the body unit 210 as a means for wireless expansion.

That is, the receiver transmission unit 274 may be configured to transmit and playback a voice signal received through the first channel receiver unit or the second channel receiver unit to the third device. This operation may also be controlled by the receiver controller 250 according to an input signal of the input unit 150.

The receiver controller 250 may control operations of the receiver digital signal processing unit 260, the first channel receiver unit 271, the second channel receiver unit 272 and the receiver transmission unit 274 based on the input signal of the input unit.

For this, the microphone controller 250 may include a central processing unit (CPU) 251, a memory 252, and a support circuit 253.

Meanwhile, although not shown in the drawings, the body unit 210 may include a speaker module connection terminal on a bottom surface thereof, and may be connected to the speaker module 230 through thereof.

In such a case, the two-channel UHF Bluetooth microphone receiver 200 is connected to a speaker module to play back a voice signal received through a short-distance communication means from the speaker module.

Meanwhile, a wireless microphone system according to another embodiment of the present invention may further include a mounting module in addition to the configuration of the wireless microphone system shown in FIG. 1.

Figure 13:
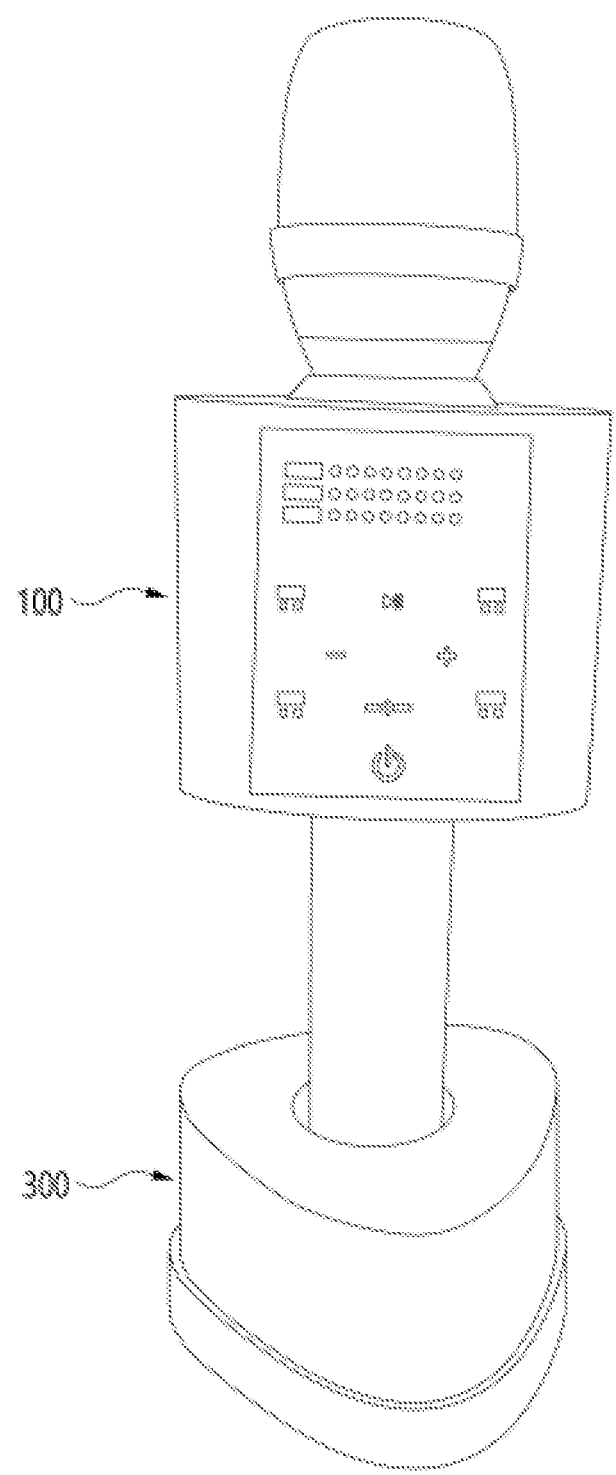
FIG. 13 and FIG. 14 are views showing an example of using a mounting module according to an embodiment of the present invention.
Figure 14:
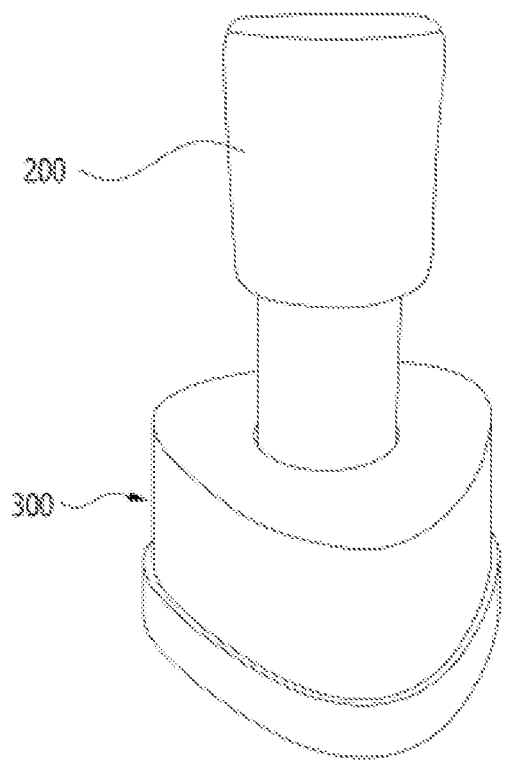

FIG. 13 and FIG. 14 are views showing an example of using a mounting module according to an embodiment of the present invention.

Referring to FIG. 13 and FIG. 14, a mounting module 300 according to an embodiment of the present invention may be installed and fixed to the multifunctional Bluetooth microphone with a touch screen 100 shown in FIG. 1 or the two-channel UHF (Ultra high frequency) Bluetooth microphone receiver 200.

According to the present embodiment, the multifunctional Bluetooth microphone with a touch screen 100 further including the mounting module 300 or the two-channel UHF Bluetooth microphone receiver 200 installed in an upright position may improve convenience of use.

Figure 15:
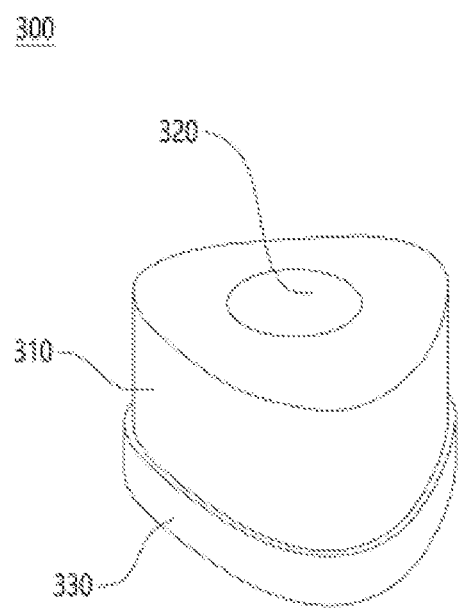
FIG. 15 shows a view of mounting module according to an embodiment of the present invention.

FIG. 15 shows a view of mounting module according to an embodiment of the present invention.

Referring to FIG. 15, the mounting module 300 may include a mounting block 310, a mounting groove 320 and support unit 330.

The mounting block 310 may be formed in a box shape having an internal space.

The support unit 330 may be provided and attached on a lower surface of the mounting block 310.

The mounting groove 320 is formed to be concaved inwards from the upper center of the mounting block, and in that at least a portion of the lower part of the multifunctional Bluetooth microphone 100 with a touch screen 100 or the two-channel UHF Bluetooth microphone receiver 200 may be inserted and accommodated.

At this point, the mounting groove 320 may be formed in a cylindrical shape corresponding to the lower shape of the UHF Bluetooth microphone receiver 200 or the cylindrical shape of multifunctional Bluetooth microphone 100 with a touch screen 100.

Figure 16:
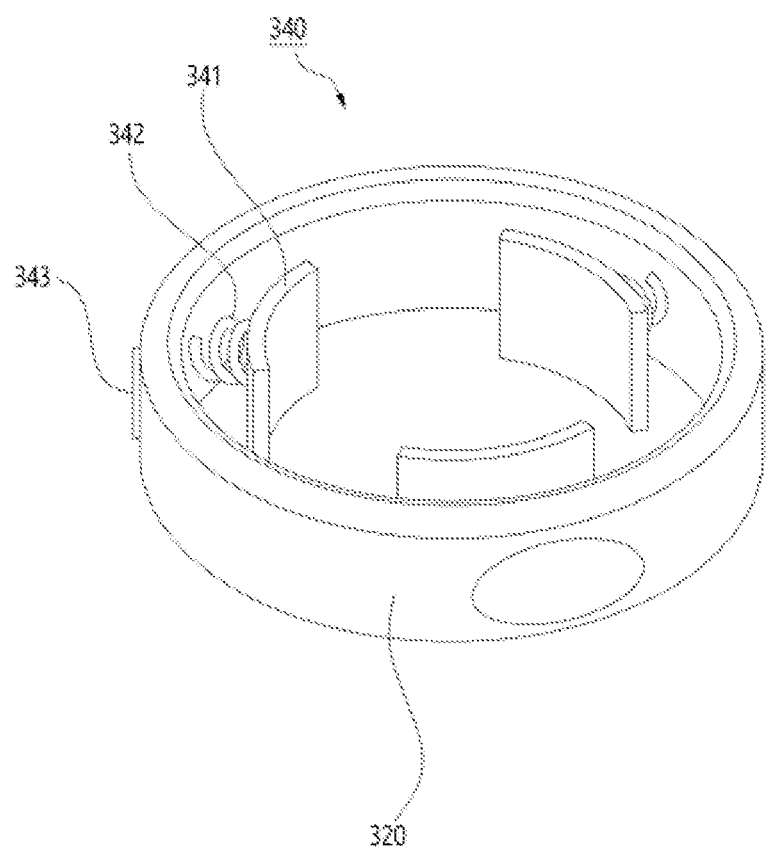
FIG. 16 is a view of a mounting groove shown in FIG. 15.

FIG. 16 is a view of a mounting groove shown in FIG. 15.

Referring to FIG. 16, the mounting groove 320 may include a fixing structure 340.

The fixing structure 340 may be provided on the wall surface of the mounting groove 320, and formed to be fixed by pressing the lower portion of the multifunctional Bluetooth microphone with a touch screen 100 or the two-channel UHF Bluetooth microphone receiver 200.

The fixing structure may include a pad unit 341, a spring 342 and a vibration generating unit 343.

A pad unit 341 may be provided in plural at equal intervals to support the multifunctional Bluetooth microphone with a touch screen 100 inserted into the mounting groove 320 or the lower portion of the two-channel UHF Bluetooth microphone receiver 200. In FIG. 16 illustrated three pad units 341 provided as an example.

The pad unit 341 may be installed on a wall surface of the mounting groove 320 through a spring 342 and may be provided to protrude from the wall surface of the mounting groove 320. That is, the pad unit 341 may exert the elasticity in a direction of protrusion from the wall surface of the mounting groove 320 due to the elastic recovering force. Accordingly, although the multifunctional Bluetooth microphone with a touch screen 100 or the two-channel UHF Bluetooth microphone receiver 200 having different circumferences inserted into the mounting groove 320, the pad unit 341 may be fixed by pressing the outer circumference surface.

The vibration generating unit 343 may be provided inside the mounting block 310, and may be connected to the pad unit 341 through the spring 342.

The vibration generating unit 343 generate vibration and apply the vibration to the pad unit 341 through the spring 342.

For example, the vibration generating unit 343 may be formed in a configuration in which at least one resonance generating unit and a vibrator vibrating by a unique resonance frequency oscillated from the oscillation unit disposed in the resonance generating unit. The vibration generating unit 343 is configured to generate vibration by oscillating the unique resonance frequency according to a preset period including a predetermined control module chip.

Such a vibration generating unit 343 may apply vibration to the multifunctional Bluetooth microphone with a touch screen 100 inserted into the mounting groove 320 or the two-channel UHF Bluetooth microphone receiver 200 according to the predetermined period, and ensure the multifunctional Bluetooth microphone with a touch screen 100 and the two-channel UHF Bluetooth microphone receiver 200 to be kept centered. For example, even if the multifunctional Bluetooth microphone with a touch screen 100 inserted into the mounting groove 320 or the two-channel UHF Bluetooth microphone receiver 200 inclined due to an external shock, the multifunctional Bluetooth microphone with a touch screen 100 and two-channel UHF Bluetooth microphone receiver 200 are rearranged vertically and supported and fixed securely.

At this point, the vibration generating unit 343, an electric unit driven by receiving current from a battery or the battery, and a signal receiver unit receiving a transmitted call signal from a calling unit not requiring any of electrical component can be manufactured at low cost and it also cost less on loss and damage.

Figure 17:
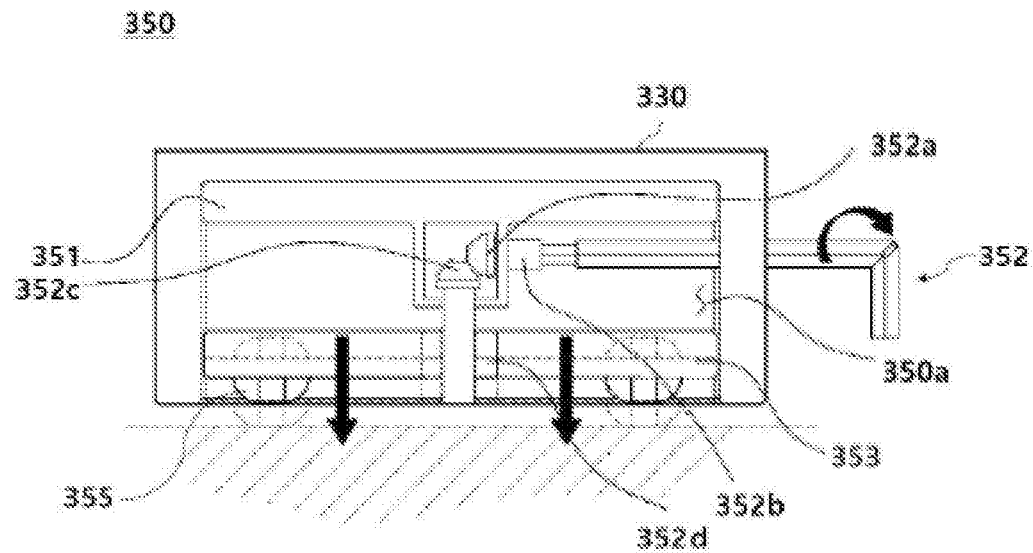
FIG. 17 is a view of a support unit shown in FIG. 15.

FIG. 17 is a view of a support unit shown in FIG. 15.

Referring to FIG. 17, the support unit 330 includes an adhesion unit 350 having an inner space and provided to move up/down in the inner space.

The adhesion unit 350 may move down in accordance with a user's control and adhered to the installation surface of the mounting module 300 by fixing the installation position of the mounting module 300.

The adhesion unit 350 may include a fixing plate 351, a moving unit 352, an adhesion plate 353 and a pressing unit 355.

The fixing plate 351 may be fixedly installed on the inner upper end of the support part 330. An elevating space 350a of the fixing plate 351 may be formed below the fixing plate 351.

The moving unit 352 may connect the adhesion plate 353 to the fixed plate 351 so as to be able to move up/down.

The moving unit 352 may include a horizontal gear 352a, an operation bar 352b, a vertical gear 352c, and a rotating rod 352d.

The horizontal gears 352a may be installed in series in the horizontal direction on a bottom surface of the fixing plate 351 through an installation bracket provided on the bottom surface of the fixing plate 351.

The operation bar 352b may extend from the horizontal gear 352a and may be provided through the support part 330. The user may be able to rotate the operation bar 352b.

The vertical gear 352c may be connected in a vertical direction by meshing with the horizontal gear 352a. The vertical gear 352c may be rotated by rotation of the horizontal gear 352a by rotation of the operation bar 352b.

The rotating rod 352d may extend from the vertical gear 352c downward direction of the vertical gear 352c and may have a thread formed at the outer circumferential surface. The rotating bar 352d may be screwed to the center of the adhesion plate 353. Accordingly, when the vertical gear 352c rotates, the adhesion plate 353 may move up/down by the rotation of the rotating rod 352d.

The adhesion plate 353 may be formed in a shape corresponding to the fixing plate 351, and a rotating rod 352d is provided through the center thereof so that it can be moved up/down in the elevating space 350a by the rotation of the rotating rod 352d.

The pressing unit 355 may be provided in plural in the adhesion plate 353.

The pressing unit 355 may be installed in the adhesion plate 353 so that at least a portion of the pressing unit 355 protrudes from a bottom surface of the adhesion plate 353.

Figure 18:
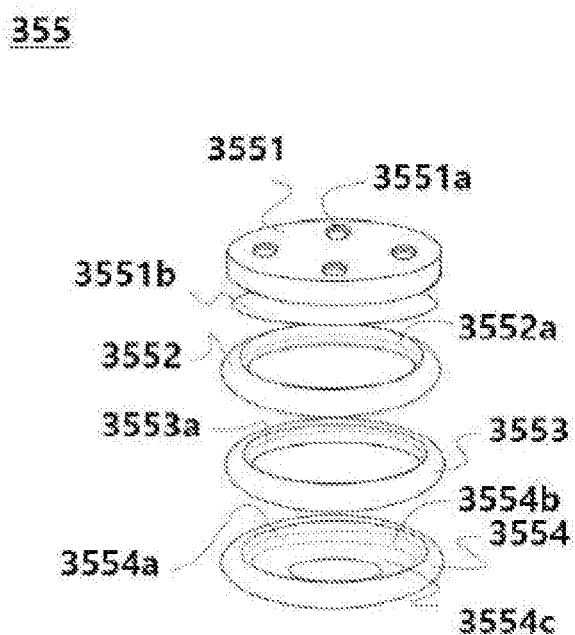
FIG. 18 is a view of a pressing unit shown in FIG. 17.

FIG. 18 is a view of a pressing unit shown in FIG. 17.

Referring to FIG. 18, the pressing unit 355 may include a pressing plate 3551, a first pressing ring 3552, a second pressing ring 3553 and a third pressing ring 3554.

The pressing plate 3551 is in a cylindrical shape having a predetermined height with a lower surface open, and may be installed in the adhesion plate 353. The pressing plate 3551 may have a plurality of fastening holes 3551a formed on the upper side thereof, and may be installed on the adhesion plate 353 through fastening means fastened to the fastening holes 3551a.

The pressing plate 3551 may include installation blades 3551b formed to radially spread downward along the outer circumferential surface of the bottom surface.

A first pressing ring 3552 to a third pressing ring 3554 may be formed in a ring shape with an open top and bottom, and may be made of urethane to create a sense of cushioning.

The first pressing ring 3552 to the third pressing ring 3554 may be adhered each other by means of mutual adhesion.

The first pressing ring 3552 may be installed on the lower side of the pressing plate 3551 through insertion of the installation wings 3551b. By coupling the first pressing ring 3552 to the third pressing ring 3554, an air through hole may be formed below the pressing plate 3551, and when the first pressing ring 3552 to the third pressing ring 3554 are pressed by the installation surface of the mounting module 300 due to inclination of the adhesion plate 353, a vacuum state may be formed.

The first pressing ring 3552 to the third pressing ring 3554 may form central portions of 3552a, 3553a and 3554a deeper than the upper portion and the lower portion, thereby forming a wider through holes and forming a strong vacuum state.

The third pressing ring 3554 forms the bottom surface 3554c by forming the lower portion 3554b narrowly, thereby the air contained therein does not leak.

When the mounting module 300 is placed on the mounting surface and the adhesion plate 353 is lowered by the rotation of the user's operation bar 352b, the pressing unit 355 may include the first pressing ring 3552 to the third pressing ring 3554 by pressing, and the mounting module 300 may be fixed securely by vacuum-absorbing on the installation surface.

Hereinafter, preferred embodiments of the present invention will be described in detail with reference to the accompanying drawings. It will be understood by those skilled in the art that the present invention may be embodied in other specific forms without departing from the spirit or essential characteristics thereof. It is therefore to be understood that the above-described embodiments are illustrations in all aspects and not restrictive.

The above-mentioned two-channel UHF Bluetooth microphone receiver may have two receiving channels of a Bluetooth receiving channel and a UHF signal receiving channel, and process a voice signal transmitted wirelessly from at least two wireless microphones in simultaneous, selective and sequential manners.

The above-mentioned mounting module can improve the convenience using the two-channel UHF Bluetooth microphone receiver in an upright position, furthermore, including a vibration generating unit not requiring any of electrical component, it can be manufactured at low cost and it also cost less on loss and damage.

The above-mentioned pressing unit can securely fix the mounting module by vacuum-absorbing on the installation surface by operation of user.

DESCRIPTION OF SYMBOLS

1000: Wireless Microphone System
100: Multifunctional Bluetooth Microphone with a Touch Screen
200 Two-channel UHF (Ultra high frequency) Bluetooth Microphone Receiver

What is claimed is:

1. A two-channel ultra-high frequency (UHF) BLUETOOTH microphone receiver formed in a cylindrical structure and connecting a connection terminal of a speaker module on a bottom surface, comprising:
   a body unit;
   a receiver digital signal processing unit provided in the body unit to perform digital signal processing on a voice signal of a human voice to add an additional function of at least one echo mode or at least one voice modulation mode of the voice;
   a first channel receiver unit provided in the body unit to receive a voice signal transmitted from a wireless microphone having a plurality of BLUETOOTH functions, applied with an antenna for receiving an RF signal, and having a receiver channel of a UHF signal;
   a second channel receiver unit provided in the body unit to receive a voice signal transmitted from a wireless microphone having a plurality of BLUETOOTH functions, applied with an antenna for receiving an RF signal, and having a receiver channel of a BLUETOOTH signal;
   a receiver transmission unit provided in the body unit to transmit the voice signal received through the first channel receiver unit or the second channel receiver unit to a third device to be played back; and
   a receiver controller provided in the body unit to control operations of the receiver digital signal processing unit, the first channel receiver unit, the second channel receiver unit, and the receiver transmission unit based on an input signal of an input unit provided in the body unit,
   wherein the body unit includes:
   a mounting module having the receiver controller, the receiver digital signal processing unit, the first channel receiving unit, the second channel receiver unit, and the receiver transmitting unit mounted thereon, connecting the speaker module on a bottom surface, and mounting by inserting a lower portion of the body unit,
   wherein the mounting module includes:
   a mounting block formed in a box shape having an internal space;
   a support unit provided to be attached on a bottom surface of the mounting block; and
   a mounting groove formed to be concaved inwards from an upper center of the mounting block to insert and accommodate the lower portion of the body unit,
   wherein the mounting groove includes:
   a fixing structure provided on a wall surface of the mounting groove to press and fix the lower portion of the body unit inserted into the mounting groove,
   wherein the fixing structure includes:
   a pad unit provided in plurality at equal intervals to support the lower portion of the body unit inserted into the mounting groove, and provided to apply an elasticity in a direction protruding from the wall surface of the mounting groove through a spring; and
   a vibration generating unit provided inside the mounting block, connected to the pad unit through the spring, configured to arrange at least one resonance generator and a vibrator vibrating by a unique resonance frequency oscillated by an oscillation unit in the resonance generator, provided with a predetermined control module chip to generate vibration by oscillating the unique resonance frequency according to a preset cycle, and applying the vibration to the pad unit through the spring.

* * * * *